(12) United States Patent
Paice et al.

(10) Patent No.: US 8,493,030 B2
(45) Date of Patent: Jul. 23, 2013

(54) METHOD FOR OPERATING AN ENERGY STORAGE SYSTEM

(75) Inventors: Andrew Paice, Daettwil (CH); Alexandre Oudalov, Fislisbach (CH); Thomas von Hoff, Niederrohrdorf (CH)

(73) Assignee: ABB Research Ltd, Zurich (CH)

( * ) Notice: Subject to any disclaimer, the term of this patent is extended or adjusted under 35 U.S.C. 154(b) by 829 days.

(21) Appl. No.: 12/626,203

(22) Filed: Nov. 25, 2009

(65) Prior Publication Data

US 2010/0127664 A1 May 27, 2010

(30) Foreign Application Priority Data

Nov. 25, 2008 (EP) .................................. 08169829

(51) Int. Cl.
- H02J 7/00 (2006.01)
- H02J 7/04 (2006.01)
- H02J 7/16 (2006.01)

(52) U.S. Cl.
USPC ........... 320/132; 320/134; 320/136; 320/152; 320/157; 320/159

(58) Field of Classification Search
CPC .......................................................... Y02E 60/12
USPC ......................................................... 320/132
See application file for complete search history.

(56) References Cited

U.S. PATENT DOCUMENTS 5,798,633 A  8/1998  Larsen et al.
7,590,472 B2 *  9/2009  Hakim et al. ................ 700/295
2001/0043013 A1  11/2001  Abe
2005/0122652 A1  6/2005  Richardson et al.
2008/0114499 A1  5/2008  Hakim

FOREIGN PATENT DOCUMENTS

| JP | 2003-317808 A | 11/2003 |
| WO | WO 03/036775 A1 | 5/2003 |
| WO | WO 2005/029667 A2 | 3/2005 |
| WO | WO 2006/076059 A2 | 7/2006 |
| WO | WO 2006/086015 A2 | 8/2006 |
| WO | WO 2007/046547 A3 | 4/2007 |
| WO | WO 2007/104167 A1 | 9/2007 |
| WO | WO 2008/058284 A2 | 5/2008 |

OTHER PUBLICATIONS

Maly et al., "Optimal battery energy storage system (BESS) charge scheduling with dynamic programming", IEE Proc-Sci Meas Technol, vol. 142, No. 6, Nov. 1995, pp. 453-458.
European Search Report dated Jun. 25, 2009.

* cited by examiner

*Primary Examiner* — Edward Tso
*Assistant Examiner* — Ahmed Omar
(74) *Attorney, Agent, or Firm* — Buchanan Ingersoll & Rooney PC

(57) ABSTRACT

The present disclosure is concerned with operation of an energy storage system (ESS) connectable to an electric power system. The charging-discharging schedule of the ESS can be determined through application of a time-dependent forecast of ESS and power system states based on historical data. Exemplary embodiments can include ESSs which have been historically activated with a certain periodicity, for example, for power system load leveling, frequency regulation, arbitrage, peak load shaving and/or integration of renewable power generation.

16 Claims, 3 Drawing Sheets

METHOD FOR OPERATING AN ENERGY STORAGE SYSTEM

RELATED APPLICATION

This application claims priority under 35 U.S.C. §119 to European Patent Application No. 08169829.2 filed in Europe on Nov. 25, 2008, the entire content of which is hereby incorporated by reference in its entirety.

FIELD

The present disclosure relates generally to the configuration and operation of an electric power system. The disclosure refers to a method for operating an energy storage system (ESS).

BACKGROUND INFORMATION

An electric power system is unique in that aggregate production and consumption are matched instantaneously and continuously, while system elements should operate within acceptable limits. Unexpected loss of generating units or transmission lines, or errors in daily load forecast, can result in sudden imbalances between generation and consumption. Such imbalances can lead to frequency deviations from the nominal frequency of the power system. This can be problematic because generators may get disconnected by over- or under-frequency protection systems and cause even larger deviations leading to a system blackout. Loads such as rotating machines should operate at constant frequency and therefore frequency deviations can result in the interruption of various manufacturing processes.

Operational variations of renewable energy generation can also occur. These operational variations can cause system frequency variation, and can lead transmission system operators to allocate more frequency regulation reserves than in the case of dispatchable energy generation.

An ESS can be effective is addressing these issues. The ESS can function as a supplier of a frequency balancing reserve. An ESS may absorb power from the grid when the actual frequency is above a defined frequency tolerance band thereby charging the battery, and an ESS may provide power to the grid when the actual frequency is below the frequency tolerance band, in that case discharging the battery.

WO 2007/104167 describes a method of operation of an ESS in which a lower state-of-charge set-point (SoC1) and an upper state-of-charge set-point (SoC2) of the battery are determined. These set-points lie between a minimum state-of-charge (SoCmin), wherein the battery is empty, and a maximum state-of-charge (SoCmax), wherein the battery is fully charged, respectively. The BESS can be controlled such that the SoC of the battery is maintained in a preferred band between the SoC1 and SoC2. The content of WO 2007/104167 is hereby incorporated by reference herein in its entirety.

U.S. Pat. No. 5,798,633 (Larsen et al.) discloses a battery energy storage system wherein an inverter is coupled to convert direct current power from a DC source to a control frequency AC power suitable for supplementing utility power or for replacing utility power. The battery energy storage system includes a control mechanism for operating the system and either a supplemental or replacement mode in parallel with a utility power system.

WO 2005/029667 describes a system for regulating frequency of generated power. An energy storage sub-system uses one or more flywheel energy storage systems to control the system frequency. Furthermore, an open-loop control uses a difference between measured frequency and reference frequency as an input signal.

Known ESSs do not operate with optimum efficiency and have unnecessarily oversized dimensions.

SUMMARY

A method is disclosed for operating an energy storage system configured for connection to a power system, the energy storage system having a physical energy storage, the method comprising: measuring a state of charge of the physical energy storage; obtaining a time-dependent forecast vector of properties of the energy storage system and of a power system; determining a charging/discharging rate for the energy storage system, based on the measured state of charge and the time-dependent forecast vector; and adjusting the charging/discharging rate of the physical energy storage in accordance with the determined charging/discharging rate.

An energy storage system is disclosed, comprising: a physical energy storage; and a control unit for controlling a charging/discharging rate of the physical energy storage by: measuring a state of charge of the physical energy storage; obtaining a time-dependent forecast vector of properties of the energy storage system and of a power system; determining a charging/discharging rate for the energy storage system, based on the measured state of charge and the time-dependent forecast vector; and adjusting the charging/discharging rate of the physical energy storage in accordance with the determined charging/discharging rate.

BRIEF DESCRIPTION OF THE DRAWINGS

The subject matter of the disclosure will be explained in more detail in the following text with reference to exemplary embodiments, which are illustrated in the attached drawings, in which.

DETAILED DESCRIPTION

Figure 1:
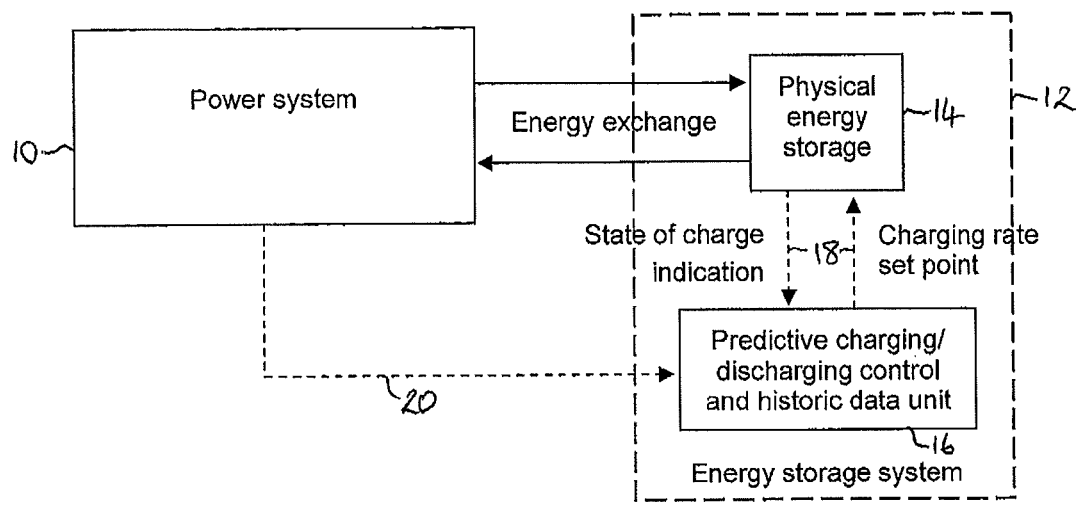
FIG. 1 schematically illustrates a power system including an ESS and an associated control unit.

Exemplary embodiments disclosed herein can provide an efficient ESS having a charging rate which optimises operation. Exemplary embodiments can improve performance of an ESS and reduce the ESS dimensions for different applications.

An exemplary method is provided for operating an ESS for connection to a power system. The energy storage system can include a physical energy storage having a dynamically adjustable charging/discharging rate. The method can include measuring a state of charge of the physical energy storage, obtaining a time-dependent forecast vector of properties of the energy storage system and the power system, determining a charging/discharging rate for the energy storage system, based on the measured state of charge and the time-dependent forecast vector, to maximise operational efficiency, and adjusting the charging/discharging rate of the physical energy storage in accordance with the determined charging/discharging rate.

The determining of a charging/discharging rate for the energy storage system can include determining a charging/discharging rate sequence.

The measuring of a state of charge of the physical energy storage can include determining a charge operation mode.

The time-dependent forecast vector of properties of the energy storage system and the power system can, for example, be based on historical data defining properties of the energy storage system and the power system.

An ESS that is operational for frequency regulation, peak load shaving, arbitrage, load leveling or integration of renewables or other utility scale applications, can be generally operated with a certain periodicity due to the nature of these purposes. In such a scenario, a statistical analysis of the power system variables can be performed over a time-span of, for example, at least one year to catch seasonal variations. Variables that may be analysed are nominal frequency, line load and customer peak load, renewable generation output, electricity market price variations. This analysis can provide information on a time-dependent behaviour of these variables (ie. deviations from the nominal values) and can be used to calculate a forecast vector, F.

Furthermore, the determining of a charging/discharging rate for the energy storage system to maximise operational efficiency can be based on a physical energy storage system model.

The physical energy storage system model can, for example, be modified dependent upon feedback of the state of charge of the physical energy storage.

Any or all of the above method steps can be repeated after a time period T or when triggered by an event which modifies the properties of the energy storage system or the power system.

An ESS is also disclosed herein which includes a physical energy storage which is connectable to a power system, and a control unit for controlling the charging/discharging rate of the physical energy storage in accordance with the methods already mentioned.

The control unit can store historical data defining the properties of the energy storage system and the power system, and can have a state of charge input from the physical energy storage and a feedback input from the power system.

An exemplary power system including an ESS is illustrated in FIG. 1. The power system 10 is in connection with the ESS 12 such that power can be transferred between them. The ESS 12 includes a physical energy storage 14 and a control unit 16 which are in bidirectional communication 18 with each other. A further communication link 20 can be located between the power system and the control system.

In operation, the communication link 20 between the power system 10 and the control unit 16 can function to provide information on the power system 10 condition to the control unit 16. The control unit 16 includes a predictive charging/discharging control function and a historic data unit. The control unit 16 provides a charging rate set point to the ESS 12 and the ESS provides a state-of-charge indication to the control unit. The charging rate set point can enable the ESS state of operation to be maintained within a certain optimal operating range. The further communication link 20 can function to provide feedback information to the control unit.

The ESS of the present disclosure may be, for example, a battery, a flywheel, a super-capacitor, an ultra-capacitor or any other type of energy storage system.

Figure 2:
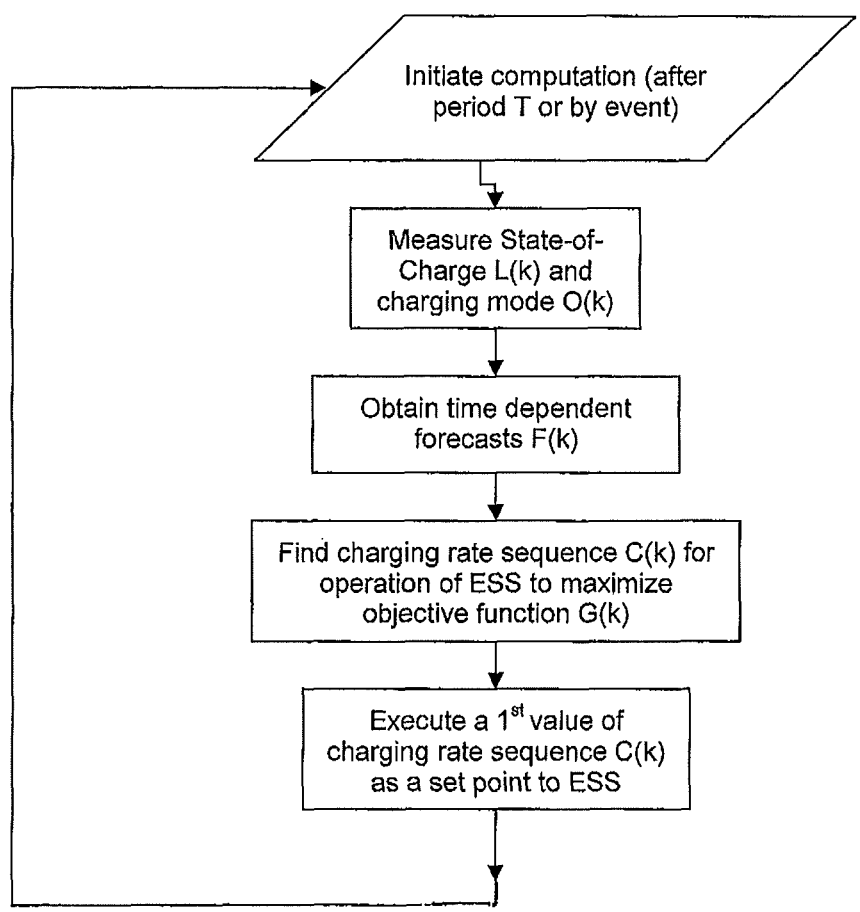
FIG. 2 shows a flow diagram of the operational method of the present disclosure.

The flow diagram of FIG. 2 shows an exemplary control operation. First, a computation of the charging rate sequence is initiated. This may occur periodically with period T (for example, 15 minutes for a load leveling application, or 1-5 seconds for frequency control) or be triggered by an event such as a fault, a variation in the electricity price, or a variation in electricity demand. Second, a state-of-charge at time k, L(k), is measured and a time-dependent forecast vector F(k) is obtained. Specifically, the time-dependent forecast vector F(k) can be obtained by reading historical data, or is generated by an external application, or can be generated by a black-box model running as an on-line estimator and predictor.

Next, a charging rate sequence starting at time k, $\underline{C}(k)$, can be determined for the operation of the ESS, for example, to maximize an objective function $G_{tot}(k)$ describing efficient operation and lifecycle aspects. The charging rate sequence C(k) determines the charging/discharging rate of the ESS. Presented in expanded form, the charging rate sequence $\underline{C}(k)$ is:

$$\underline{C}(k)=[C(k),\ldots,C(k+M-1)]$$

and similarly, an objective function is:

$$G_{tot}(k)=G(k)+G(k+1)+\ldots+G(k+M-1).$$

An optimal charging rate sequence C(k) over a horizon of M time steps can be determined (as detailed with reference to FIG. 3).

The first value of the charging rate sequence C(k), C(k) can be executed as a charge set point to the ESS. As stated above, after period T or triggered by an event, the procedure of finding a new optimal charging/discharging rate can be repeated, and thus the process returns to the first step of FIG. 2 and repeats the functions in the control operation in respect of times k+1, . . . , k+M. In this way, the charging rate sequence for C(k+1)=[C(k+1, . . . , C(k+M)] can be determined utilizing new states [L(k+1), O(k+1)] and new time-dependent forecast F(k+1)=[F(k+1, . . . , F(k+M)]. The state O(k+1) is defined as the new current charge operation mode.

A Model-Predictive Control (MPC) standard may be utilized for the control operation computation defined in FIG. 2. The MPC enables an optimal control step to be determined that anticipates the behavior of the power system M time steps into the future. After the first cycle, the situation can be reassessed by repeating the procedure. This allows the ESS to react on any unforeseen disturbances.

The complete charging rate sequence for $\underline{C}(k)=[C(k), \ldots, C(k+M-1)]$ can be determined at each control operation cycle. However, only the first value of the determined charging rate sequence $\underline{C}(k)=[C(k), \ldots, C(k+M-1)]$, is executed as a charge set point to the ESS. The second and further values in the sequence are not applied but are calculated for an optimal anticipation of the dynamics.

An exemplary control operation of the present disclosure is now explained in further detail with reference to FIG. 3. FIG. 3 schematically shows a model on which the control logic can be based for deducing an optimal control sequence. A model of a physical ESS receives an input from a physical parameter vector Q which includes ESS and power system model parameters, from a one step time delay D and from a charging rate sequence at time k, C(k). The model of a physical ESS provides an output of L(k), O(k); where L(k) is the state of charge at time k, and O(k) is current charge operation mode. This output of the model of a physical ESS is input to an objective criterium block and also into the one step time delay D. The objective criterium block also receives inputs from an economic model parameter vector P, a time-dependent forecast vector F(k) and the charging rate sequence C(k). The objective criterium block provides an output of an objective function, G(k). In relation to FIG. 1, the following parameters can be stored in the historic data unit; the physical parameter vector Q, the economic model parameter vector P and the time-dependent forecast vector F(k).

The charging rate sequence C(k) determines the charging/discharging rate of the ESS. The physical ESS model can be a dynamic model which contains two states—a level L(k) and a mode O(k). As previously defined, the level L(k) describes the amount of stored energy (also referred to as the "state of charge"). The mode O(k) is a discrete value;
O(k)=−1 describes a discharging mode
O(k)=0 describes an idle mode
O(k)=1 describes a charging mode
The physical parameter vector Q defines parameters such as the charge/discharge efficiency of the ESS and the storage efficiency of the ESS. The effect of the time delay D on states L(k) and O(k) is to modify them to L(k−1) and O(k−1), respectively.

The calculation performed by the model of a physical ESS on its inputs can be defined as follows:

$$L(k) = f(C(k), L(k-1), O(k-1); \underline{Q})$$

$$O(k) = \text{sgn}(C(k))$$

The level of the stored energy L(k), is determined as a function of the charge rate sequence C(k), the former level of stored energy L(k−1), the former mode O(k−1) (charging or discharging) and the physical parameter vector Q which contains some physical parameters of the ESS and the power system.

The objective criterium block functions to evaluate the objective function G(k) of the physical ESS model over a prediction horizon M for a charging rate sequence C(k). The prediction horizon M is a time period, the length of which is defined such that within this period the physical energy storage could be charged and discharged several times. (In practice, this can be from a few minutes up to a few hours, depending on the application.) As stated above, the objective criterium block receives inputs from an economic model parameter vector P (containing static economic model parameters) and a time-dependent forecast vector F(k) (containing time-varying forecast variables). The static economic model parameters are, for example, ESS lifecycle cost (changing from charge to discharge, depth of discharge). The time-varying forecast variables are, for example, a forecast of power price, a forecast of power system frequency, a forecast of peak load and a forecast of charging/discharging capacity reserves.

The calculation performed by the objective criterium block on its inputs can be defined as follows:

$$G(k)=h(L(k),\underline{F}(k),C(k),O(k),O(k-1);\underline{P})$$

As specified in respect of FIG. 2, the time-dependent forecast vector F(k) is obtained by reading historical data, or it is generated by an external application, or it is generated by a black-box model running as an on-line estimator and predictor.

Figure 3:
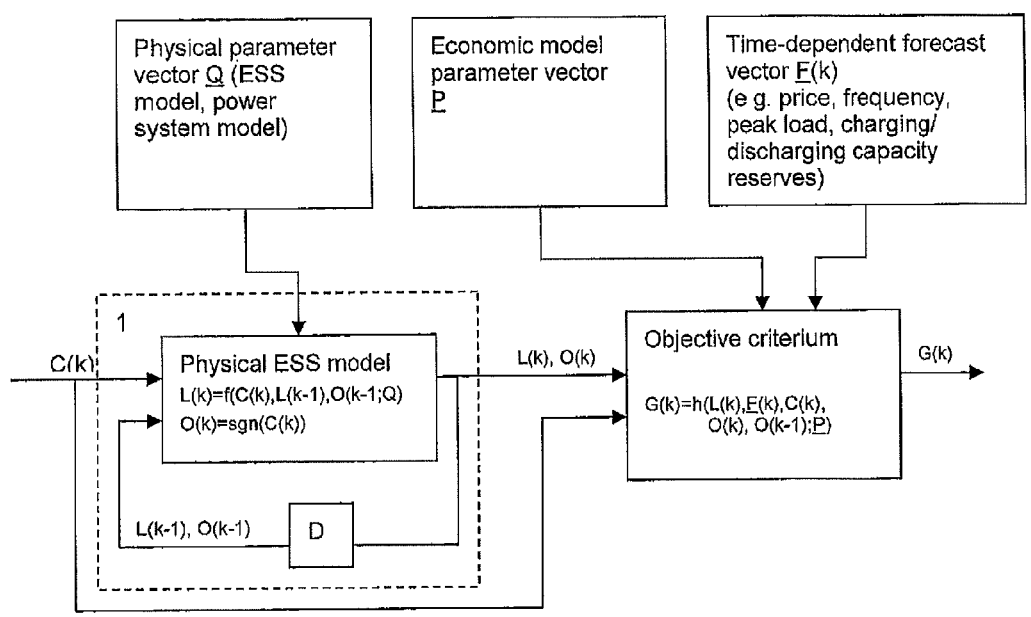
FIG. 3 schematically illustrates the control function of an ESS of the present disclosure.

The skilled person would be aware that the control logic represented schematically in FIG. 3 may be realised as software and/or hardware and may be located locally or remotely from the physical energy storage. Further, it would be clear to the skilled person that modification of the charging rate sequence in shorter time periods will be possible where, for example, the statistical data analysis used for the predictive control was collected with greater frequency of sampling.

It is noted that the reduced storage capacity requirement of the ESS of the present disclosure, in comparison with the known ESS arrangements, can lead to a lower capital cost of the ESS.

In summary, exemplary embodiments disclosed herein can determine a charging rate sequence C(k) of an ESS that optimizes aspects of the ESS operation. For example, this is a dynamic adjustment of the state of charge of the ESS can be based on statistical analysis of historical data. This disclosure is relevant to ESSs which have been historically activated with a certain periodicity, for example, for power system load leveling, frequency regulation, arbitrage, peak load shaving and/or integration of renewable power generation.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for operating an energy storage system configured for connection to a power system, the energy storage system having a physical energy storage, the method comprising:
   measuring a state of charge of the physical energy storage;
   obtaining a time-dependent forecast vector of properties of the energy storage system and of a power system;
   determining a charging/discharging rate for the energy storage system, based on the measured state of charge and the time-dependent forecast vector; and
   adjusting the charging/discharging rate of the physical energy storage in accordance with the determined charging/discharging rate.

2. The method according to claim 1, wherein the determining of a charging/discharging rate for the energy storage system comprises:
   determining a charging/discharging rate sequence.

3. The method according to claim 1, wherein the measuring of a state of charge of the physical energy storage comprises:
   determining a charge operation mode.

4. The method according to claim 1, wherein the time-dependent forecast vector of properties of the energy storage system and the power system is based on historical data defining the properties of the energy storage system and the power system.

5. The method according to claim 1, wherein the determining of a charging/discharging rate for the energy storage system is based at least in part on a physical energy storage system model.

6. The method according to claim 5, wherein the physical energy storage system model is modified dependent upon feedback of the state of charge of the physical energy storage.

7. The method according to claim 1, wherein the measuring, obtaining, determining and adjusting are repeated after a time period, or when triggered by an event which modifies the properties of the energy storage system or the power system.

8. An energy storage system, comprising:
   a physical energy storage; and
   a control unit for controlling a charging/discharging rate of the physical energy storage by:
   measuring a state of charge of the physical energy storage;
   obtaining a time-dependent forecast vector of properties of the energy storage system and of a power system;
   determining a charging/discharging rate for the energy storage system, based on the measured state of charge and the time-dependent forecast vector; and adjusting the charging/discharging rate of the physical energy storage in accordance with the determined charging/discharging rate.

9. The energy storage system of claim 8, wherein the control unit stores historical data defining the properties of the energy storage system and the power system, and has a state of charge input from the physical energy storage and a feedback input from the power system.

10. The energy storage system of claim 8, in combination with a power system to which the energy storage system is connected.

11. The method according to claim 1, wherein the charging/discharging rate is determined to maximize operational efficiency.

12. The method according to claim 2, wherein the measuring of a state of charge of the physical energy storage comprises:
determining a charge operation mode.

13. The method according to claim 12, wherein the time-dependent forecast vector of properties of the energy storage system and the power system is based on historical data defining the properties of the energy storage system and the power system.

14. The method according to claim 13, wherein the determining of a charging/discharging rate for the energy storage system is based at least in part on a physical energy storage system model.

15. The method according to claim 14, wherein the physical energy storage system model is modified dependent upon feedback of the state of charge of the physical energy storage.

16. The method according to claim 15, wherein the measuring, obtaining, determining and adjusting are repeated after a time period, or when triggered by an event which modifies the properties of the energy storage system or the power system.

* * * * *